(12) United States Patent
Lin et al.

(10) Patent No.: US 9,197,144 B2
(45) Date of Patent: Nov. 24, 2015

(54) METHOD AND SYSTEM FOR CONTROLLING A MOTOR

(71) Applicant: MARVELL INTERNATIONAL LTD., Hamilton (BM)

(72) Inventors: Song Lin, Singapore (SG); Chao Bi, Singapore (SG)

(73) Assignee: Marvell International Ltd., Hamilton (BM)

(*) Notice: Subject to any disclaimer, the term of this patent is extended or adjusted under 35 U.S.C. 154(b) by 210 days.

(21) Appl. No.: 13/943,635

(22) Filed: Jul. 16, 2013

(65) Prior Publication Data

US 2014/0015458 A1 Jan. 16, 2014

Related U.S. Application Data

(60) Provisional application No. 61/671,829, filed on Jul. 16, 2012.

(51) Int. Cl.
H02P 6/00 (2006.01)
H02P 6/18 (2006.01)
H02P 6/20 (2006.01)
G11B 19/20 (2006.01)

(52) U.S. Cl.
CPC ............ *H02P 6/001* (2013.01); *G11B 19/2054* (2013.01); *H02P 6/188* (2013.01); *H02P 6/20* (2013.01)

(58) Field of Classification Search
CPC ..... G11B 19/2054; H02P 6/001; H02P 6/188; H02P 6/20

USPC ................. 318/400.03, 721, 400.12, 400.11, 318/400.09, 400.04, 400.16
See application file for complete search history.

(56) References Cited

U.S. PATENT DOCUMENTS

| 6,249,396 | B1 | 6/2001 | Gray |
| 6,873,482 | B1 | 3/2005 | Hsieh et al. |
| 6,901,212 | B2 * | 5/2005 | Masino ..................... 318/400.35 |
| 7,334,854 | B1 * | 2/2008 | Chang et al. ............. 318/400.11 |
| 7,777,436 | B2 * | 8/2010 | Brown et al. ............. 318/400.01 |
| 7,893,649 | B2 * | 2/2011 | Lamprecht ..................... 318/721 |
| 8,390,226 | B1 * | 3/2013 | Krishnamoorthy et al. .. 318/432 |
| 8,400,086 | B2 * | 3/2013 | Cheng ..................... 318/400.02 |

(Continued)

FOREIGN PATENT DOCUMENTS

| JP | 2005065361 A | 3/2005 |
| JP | 2006262569 A | 9/2006 |

OTHER PUBLICATIONS

International Search Report and Written Opinion for related PCT Application No. PCT/SG2013/000309 mailed Oct. 10, 2013; 12 pages.

*Primary Examiner* — Rita Leykin

(57) ABSTRACT

A method and system for controlling a motor is provided. In particular, various embodiments of the present disclosure describe a method and system for controlling a spindle motor in a hard disk drive (HDD) A method of controlling a motor is provided, the motor including a 3-phase synchronous motor with three terminals of an electromagnetic winding configuration. The method includes providing an input voltage between two of the terminals and measures a resultant silent terminal voltage at the third terminal, which is thereafter used in determining a rotor position. A corresponding system for controlling a motor is further provided.

22 Claims, 14 Drawing Sheets

(56) References Cited

U.S. PATENT DOCUMENTS

| | | | |
|---|---|---|---|
| 8,766,583 B1 * | 7/2014 | Krishnamoorthy et al. | 318/599 |
| 8,796,974 B2 * | 8/2014 | Wang et al. | 318/400.37 |
| 2004/0056628 A1 | 3/2004 | Kandori | |
| 2012/0146626 A1 * | 6/2012 | Bieler et al. | 324/207.16 |
| 2013/0057193 A1 | 3/2013 | Iwaji et al. | |

\* cited by examiner

METHOD AND SYSTEM FOR CONTROLLING A MOTOR

RELATED APPLICATIONS

This application claims the benefit of U.S. Provisional Application No. 61/671,829, filed on 16 Jul. 2012. The disclosure of the above priority application is hereby incorporated by reference in its entirety.

TECHNICAL FIELD

The present disclosure describes embodiments generally related to a method and system for controlling a motor. In particular, various embodiments of the present disclosure relate to a method and system for controlling a spindle motor in a hard disk drive (HDD). Yet further, various embodiments describe a method and system for detecting the initial rotor position of a spindle motor when the motor is at rest.

BACKGROUND

A HDD is a data storage device used for storing and retrieving digital information using rapidly rotating discs coated with magnetic material. A typical HDD includes one or more rigid rapidly rotating disks with magnetic heads arranged on a moving actuator arm to read and write data onto the disk surfaces. The disks are placed about a spindle, and are spun rapidly about the spindle as information is written to and read from the disk surface as it rotates past the magnetic read-and-write heads that operate closely over the magnetic surface. The read-and-write head is used to detect and modify the magnetization of the material immediately under it. A spindle motor is provided with the spindle for the spinning or rotating of the disks.

The spindle motor used in HDDs is typically a brushless direct current (BLDC) motor, which is an electronically self-commutated motor. The BLDC motor is a 3-phase synchronous motor with a surface mounted permanent magnet ring on the motor that generates sinusoidal back electro-motive force (BEMF) in the stator windings. In electrical machines, such as a motor, where a rotor rotates about a stator in converting electrical energy to or from mechanical energy, position sensors, such as a position encoder may be provided in order to determine the present position of the rotor during operation.

Due to cost, reliability, as well as space issues in the push to miniaturize hardware, some HDD manufacturers presently have chosen to move on from the use of such sensors, and have instead decided to rely on sensorless operation of the spindle motor. In the present art, multiple operation schemes have been proposed for sensorless control in detecting the rotor position, mostly relying on detection and analysis of the resultant BEMF which is generated by an electromagnetic field against the inducing current.

However, in the situation where the spindle motor is at rest, an initial position of the rotor has to be determined in order to correctly start the motor, such that the rotor can be controlled to spin in the correct direction, as well as to determine the sufficient amount of induced electromagnetic torque to rapidly accelerate the rotor of the motor for efficient operation. In such case, the use of BEMF detection is severely restricted, as BEMF generated is at zero, or at very low levels when the rotor is static or almost static.

Hence, a need exists for a system and method for controlling a motor, including determining the initial position of a rotor of a spindle motor, in order to start the motor up quickly and efficiently.

SUMMARY

According to an aspect of the present disclosure, there is provided a method of controlling a motor, the motor including a 3-phase synchronous motor with three terminals of an electromagnetic winding configuration, the method including: providing an input voltage between two of the three terminals of the electromagnetic winding configuration; measuring a resultant silent terminal voltage at the third terminal of the electromagnetic winding configuration; and determining a rotor position based on the measured silent terminal voltage.

In an aspect of the present disclosure, there is provided a system for controlling a motor, including: a 3-phase synchronous motor with a switching circuit coupled to three terminals of an electromagnetic winding configuration, the system including: the switching circuit for closing an electrical circuit and a voltage source configured to provide an input voltage between two of the three terminals of the electromagnetic winding configuration; and a rotor position detection module for configured to measure a resultant silent terminal voltage at the third terminal of the electromagnetic winding configuration; wherein the rotor position detection module determines a rotor position based on the measured silent terminal voltage.

BRIEF DESCRIPTION OF THE DRAWINGS

In the drawings, like reference characters generally refer to the same parts throughout the different views. The drawings are not necessarily to scale, with emphasis instead generally being placed upon illustrating the principles of the present disclosure. It is to be noted that the accompanying drawings illustrate only examples of embodiments of this disclosure and are therefore not to be considered limiting of its scope, for the disclosure may admit to other equally effective embodiments. In the following description, various embodiments of the disclosure are described with reference to the following drawings, in which.

DETAILED DESCRIPTION

In a BLDC motor, a stator usually includes a plurality of coil windings, and a rotor includes a permanent magnet, and is arranged to rotate about a rotor. As indicated above, rotor position information is required when starting or when driving the BLDC motor in order to energize the correct stator windings. In sensorless operation of the BLDC motor, difficulties arise at or near rotor standstill in view of the difficulty of determining BEMF, and additional algorithms or schemes are required in order to detect the initial position of the rotor at or near zero speed.

One way to start up the BLDC motor is to align the rotor to a pre-defined position by applying certain current into the electromagnetic windings or armature windings for a predetermined time period. The motor can then be started up by applying a certain control sequence. Such a scheme provides certain timing restrictions, which may not be desirable or feasible, especially in the use of the BLDC motor as a spindle motor for HDD applications, in which access to data is promptly required and in the order of milliseconds.

Figure 1A:
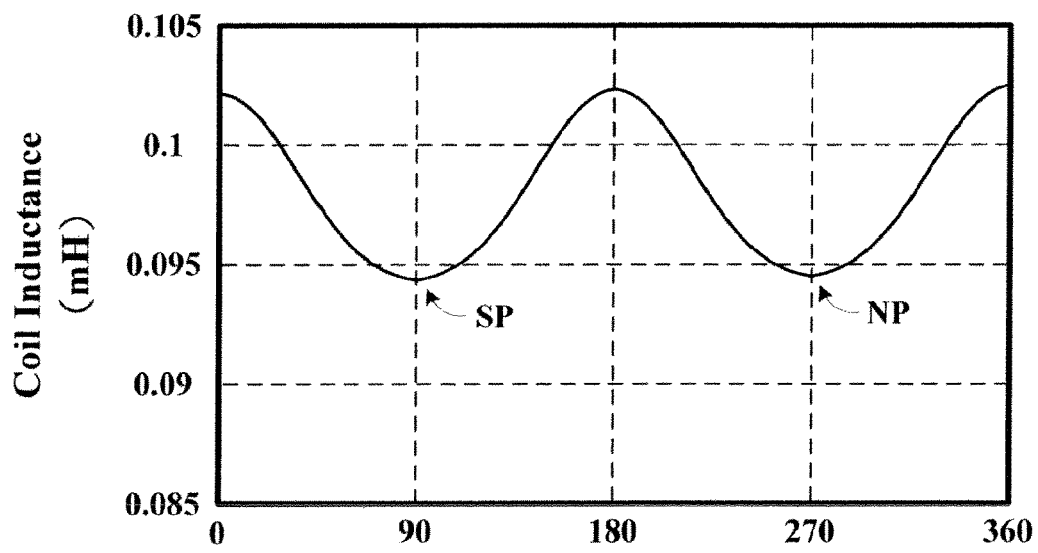
FIG. 1A illustrates the characteristics of a coil inductance with respect to the rotor position.

Another way to detect the initial rotor position is to explore the magnetic field saturation effect, which will cause the winding inductance vary at different position when current is applied. FIG. 1A illustrates the characteristics of a coil inductance with respect to the rotor position. In chart 10, the coil inductance of a stator coil winding is plotted with respect to the rotor position angle of the rotor of a motor. When the coil is aligned with the north pole (NP) and the south pole (SP) of the permanent magnet on the rotor, the coil is subjected to magnetic saturation, leading to a reduction of the coil inductance. Further, when positive and negative currents are injected into the phase windings, the relationship between the coil inductance and the rotor position is affected due to the magnetic interaction between the coil's magnetic field and the permanent magnet's field.

Figure 1B:
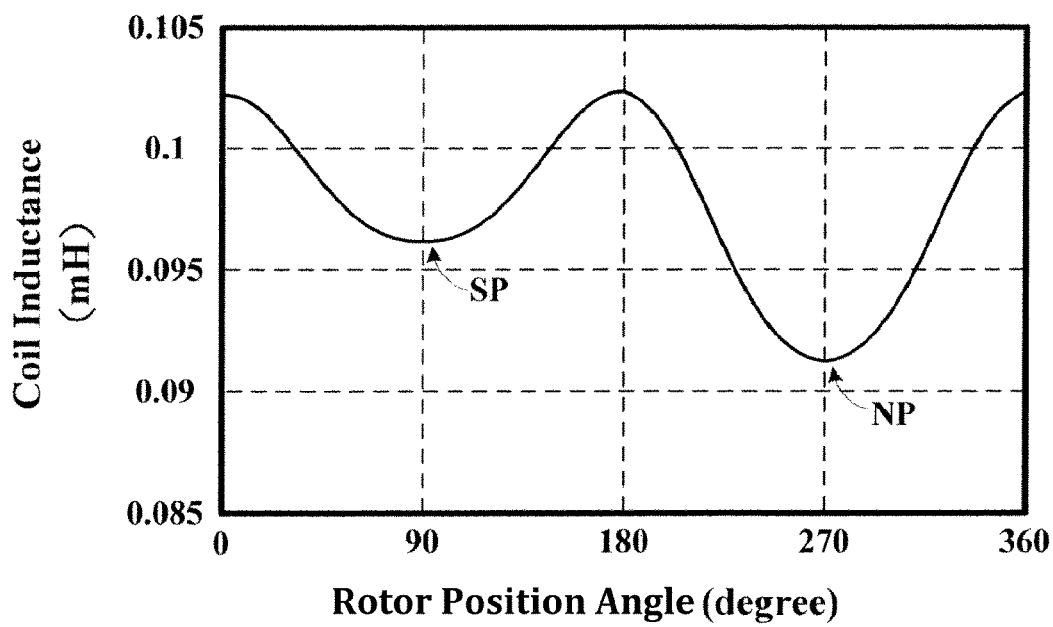
FIG. 1B illustrates the characteristics of a coil inductance with respect to the rotor position when current is applied to the electrical windings of the motor.

FIG. 1B illustrates the characteristics of a coil inductance with respect to the rotor position when current is applied to the electrical windings of the motor. In chart 20, the coil inductance of a stator coil winding is plotted with respect to the rotor position angle of the rotor of a motor, in a case where motor current is present. When the current applied to the coil is such that the magnetic field generated by the coil has the south pole aligned with respect to the south pole of the permanent magnet (SP), the coil inductance becomes larger than the case where no current is applied because the magnetic saturation is relaxed due to the opposite directions of the two magnetic fields. When the current applied to the coil is such that the magnetic field generated by the coil has the south pole aligned with respect to the north pole of the permanent magnet (NP), the coil inductance becomes smaller than in the case where no current is applied because the magnetic saturation is enhanced due to the same directions of the magnetic fields.

Figure 2:
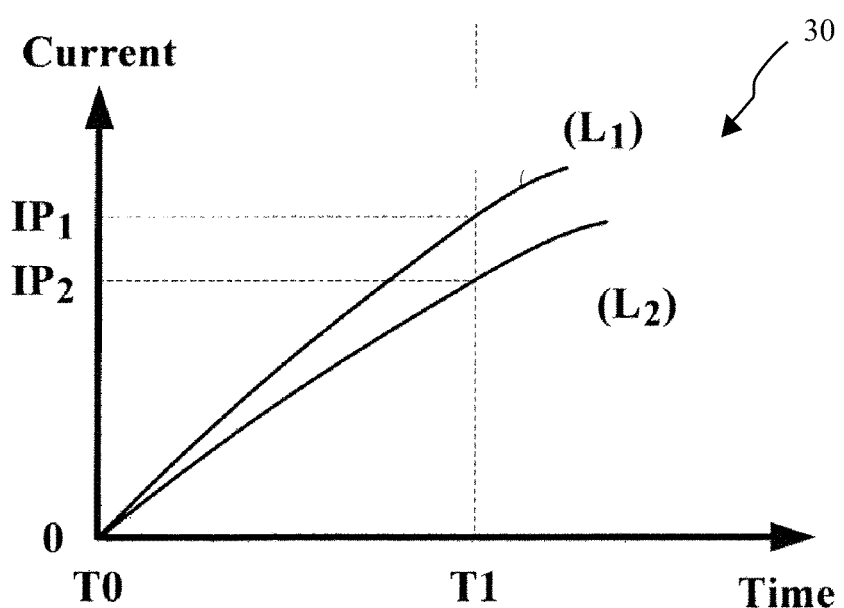
FIG. 2 illustrates how two different inductances respond to a similarly applied DC voltage.

FIG. 2 illustrates how two different inductances respond to a similarly applied DC voltage. In chart 30, a stator coil winding coil current is plotted with respect to time. When DC voltage is applied to the electrical windings, a gradually-increasing coil current is generated. Different coil inductances cause different increasing rates of coil current, for example, a smaller coil inductance results in a larger increasing rate of coil current. In FIG. 2, a DC voltage VDC is applied to each of the inductors L1 and L2 from time T0 to T1. If inductor L1 is smaller than the inductor L2, the current response for L1 has a larger slope than a current response for the inductor L2. Thus, at time T1, a peak current IP1 flowing through inductor L1 is larger than a peak current IP2 flowing through inductor L2.

A common method for driving a BLDC motor provides a plurality of detection modes which apply positive and negative currents into phase windings of the stator. In doing so, the saturation of the generated magnetic field is changed respectively, which results in different inductance values. The inductance of electrical windings or coils in the stator are not fixed, but are instead subject to the influence of the permanent magnet in the rotor, particularly, the angular direction of the rotor and of the magnetic poles of the permanent magnets in the rotor.

Introducing the phase currents subsequently generates a composite magnetic field that each resultantly points in different directions. The peak values of the motor currents generated by each detection mode are thereafter compared to obtain the detection mode which generates the largest current. The initial position of the rotor is determined on a basis of a composite magnetic field generated by the detection mode which generates the largest current peak value.

Although such a method does allow sensorless operation of the BLDC motor in identifying the initial position of the rotor, response time can still be improved in the stepping through and monitoring rise time of the resultant currents in the various detection modes. Further, certain motor designs utilize stators which include unbalanced windings. In such motors, the inductance of each phase is already different in value. It may be thus difficult to rely on the accuracy of current rise time measurements in such situations.

Embodiments of a system and method for controlling a motor are described in detail below with reference to the accompanying figures. However, it should be understood that the disclosure is not limited to specific described embodiments. It will be appreciated that the embodiments described below can be modified in various aspects, features, and elements, without changing the essence of the disclosure. Further, any reference to various embodiments shall not be construed as a generalization of any inventive subject matter disclosed herein and shall not be considered to be an element or limitation of the appended claims except where explicitly recited in a claim(s).

According to various embodiments, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" herein means "and/or" unless specifically indicated otherwise.

In an embodiment, a spindle motor is provided for a hard disk drive, particularly a brushless direct current motor is provided. In the embodiment, the BLDC motor is a 3-phase synchronous motor and includes a stationary portion or stator with an electromagnetic winding configuration and a rotating portion or rotor with a surface mounted permanent magnet ring. It is noted that the system and method for controlling a motor may be carried out on the spindle motor as according to the embodiment, but it is not limited to such a motor. The claims to the present disclosure reflect such an understanding where the motor does not form part of the scope of the claims.

Figure 3:
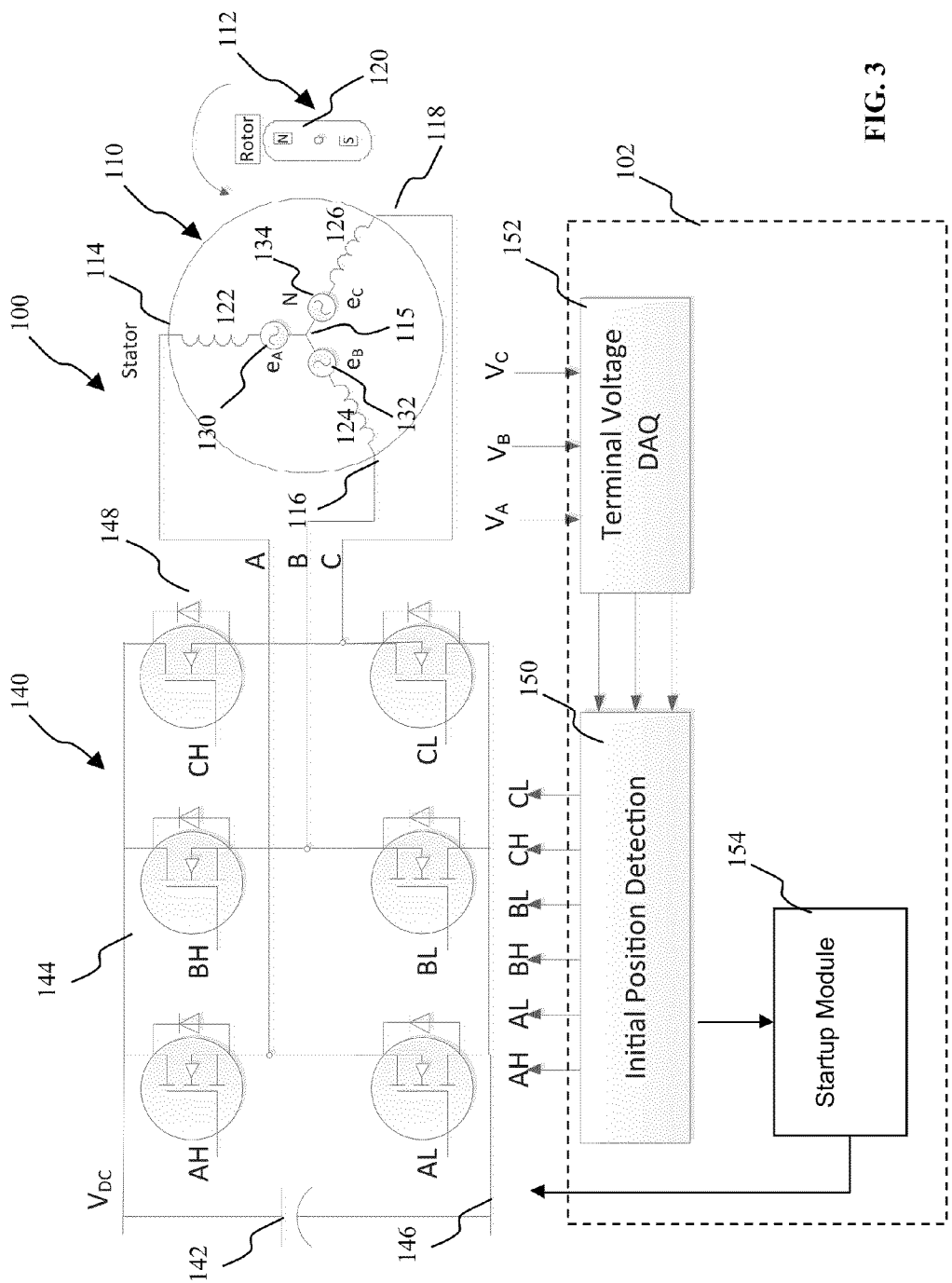
FIG. 3 illustrates an equivalent circuit for the control of a motor according to an embodiment.

FIG. 3 illustrates an equivalent circuit for the control of a motor according to an embodiment of the disclosure. Motor 100, which is a BLDC motor, is shown, and includes, in particular, a stator 110 and a rotor 112. A surface mounted permanent magnet 120 is representatively illustrated in the figure by the resultant pole direction—North (N) and South (S), on the rotor 112. It is noted that in other embodiments, the permanent magnet on the rotor 112 may also be provided as an interior permanent magnet.

Stator 110, in its physical representation, includes three cogs about which copper or any other appropriate conductor is wound to provide three electromagnetic windings or phase legs or terminal legs. In other embodiments, the stator may include additional cogs with multiple pole pairs, but in each case, the stator 110 may still be represented electrically as having three phase or terminal legs—leg A 114, leg B 116 and leg C 118. In an embodiment, the stator 110 includes electromagnetic windings in a wye winding configuration, which connects all the windings to a central intersection point 115 and provides for power to be supplied at the opposite terminal end. A 3-phase delta configuration is also possible, to provide a higher rotational speed if required.

Further, the physical winding coils, which include both resistive and inductive elements, are simply represented electrically in FIG. 3 by inductors LA 122, LB 124, and LC 126 respectively on each leg of the winding configuration.

Control of the BLDC motor 100 is provided by a switching circuit 140 including a plurality of switches, the switching circuit in operation being synchronized with the position of the rotor 112 for proper and accurate control of the motor 100. In the embodiment, the switches are semiconductor switches, particularly gate-driven insulated gate bipolar transistor (IGBT) switches. In other embodiments, other switches may instead be provided, for example, metal oxide field-effect transistors (MOSFET), gate turn-off thyristors (GTO), or bipolar junction transistors (BJT), or simple micro-controller controlled electrical switches.

The switches of the switching circuit 140 are representatively labeled as AH, AL, BH, BL, CH, CL, each switch when activated coupling the respective terminal leg A, B, or C, to either a positive rail 144 of a DC link 142, which is at a voltage level VDC, or to a negative rail 146 of the DC link 142, which is at electrical ground. The representative labels AH, AL, BH, BL, CH, CL, may be taken to denote switches for connecting a specific leg of the stator (A, B, and C), to the positive or negative rail of the DC link (H-high and L-low respectively). It may be noted that the DC link 142 is further coupled to an electrical source, preferably through a rectifier module including a further circuit of semiconductor switches, for control of the electrical machine. In the embodiment, the DC link 142 acts as a voltage source for a closed electrical circuit including the coils of the stator 110.

It is also noted that a free-wheeling diode 148 is provided in parallel across each IGBT switch, particularly across the collector-emitter terminals of the IGBT, to conduct reverse current. These diodes are required, since switching off an inductive load current can generate high voltage peaks if a suitable path is not provided, which could destroy the semiconductor IGBT switch.

The motor 100 includes a controller 102 which further includes a processor (not shown) which provides various functionalities according to various embodiments of the disclosure. The processor may comprise a memory which is for example used in the processing carried out by the processor. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments. Similarly, a "module" is thusly defined as a portion of a system according to the present disclosure and may encompass a "circuit" as above, or may be understood to be any kind of a logic-implementing entity therefrom.

In the embodiment, the controller 102 is provided for controlling the operation of the motor 100, including sensorless operation of the motor when the spindle is already in motion. Such operational control is well-known in the present art and will not be discussed in the present disclosure.

In the present embodiment, an initial position detection module 150 is provided in the controller 102, and provides gate control signals, for each of the switches AH, AL, BH, BL, CH, CL. Although the motor controller 102 typically utilizes pulse-width modulation (PWM) schemes in the provision of gate control signals or gating signals, the initial position detection module 150 may not utilize such a scheme as detecting the initial position according to the present disclosure only requires a short control period and does not play a crucial role in the control of rotational speed of the rotor.

Further, the initial position detection module 150 is coupled to a terminal voltage digital acquisition (DAQ) module 152. The terminal voltage DAQ module 152 is arranged to receive voltage waveforms of the phase legs 114, 116, 118 and include corresponding voltage sensors to determine the BEMF eA 130, eB 132, and eC 134, of each corresponding phase leg A 114, phase leg B 116, and phase leg C 118. The voltage sensors are provided according to the present embodiment for the detection and measurement of BEMF eA 130, eB 132, and eC 134 or phase voltages in response to input stimulus provided by the initial detection module 140. In accordance to various embodiments, the method of the present disclosure only needs to measure the three terminal voltages during the positive and negative pulse injections. Different voltage patterns may be observed at different rotor positions and thus the initial position can be identified.

In the following, operation of the initial position detection module 150 will be described. According to various embodiments, the controller 102 of the motor 100 carries out a method of controlling a motor. In particular, the initial position detection module 150 carries out a method for determining an initial rotor position of the motor in the control of the motor.

In operation, the initial position detection module 150 of the present disclosure is configured to provide an electrical inject through the switching circuit 140 to the stator 110, in particular to provide a voltage pulse through two phases of the windings, and thereafter to obtain a measurement on the silent third phase of the windings, the measurement consequently used in determining the initial rotor position of the motor 100. It is of course noted that the initial position detection module 150 carries out the presently required operation when the motor 100, specifically the rotor 112, is at rest, i.e. the rotational speed of the rotor 112 is zero, or substantially zero.

For example, gate signals are provided to activate the switches AH and BL, in order to close an electrical circuit and provide input voltage VDC through phase leg A 114 and leg B 116 to ground. In this case, the phase leg C 118 is considered to be the silent phase as injected current does not flow through the phase leg. It can be shown by the equations below that the voltage across phase leg C 118 as a result of the voltage injection is influenced by the actual inductance across leg A 114 and leg B, as well as the magnetic field interference due to the position of the rotor 112.

Equation (1) provides an understanding of the voltage drop through phase leg A 114 and leg B 116. Equation (1) can be worked out to provide the motor current or phase leg current through legs A and B in Equation (2). The resultant induced voltage can then be worked out for the silent phase leg C 118 in Equation (3).

$$V_{AB} = R_{AB} i_{AB} + L_{AB} \frac{d i_{AB}}{dt} \Rightarrow \quad (1)$$

$$i_{AB} = \frac{V_{AB}}{R_{AB}} \left(1 - e^{-\frac{R_{AB}}{L_{AB}} t}\right) \quad (2)$$

$$V_C = V_{DF} + R_{AB} i_{AB} + L_B \frac{d i_{AB}}{dt} = \quad (3)$$

$$V_{DF} + V_{AB} \frac{R_B}{R_{AB}} + V_{AB} \left(\frac{L_B}{L_{AB}} - \frac{R_B}{L_{AB}}\right) e^{-\frac{R_{AB}}{L_{AB}} t}$$

Where VAB is the voltage drop through phase leg A 114 and leg B 116, RAB is the sum of resistance across phase leg A 114 and leg B 116, iAB is the current passing through phase leg A 114 and leg B 116, LAB is the total inductance across phase leg A 114 and leg B 116, and $$\frac{d i_{AB}}{dt}$$

is the rate of change of current across phase leg A 114 and leg B 116. VDF represents the voltage drop across the freewheeling diodes 148.

Further, if AH and BL as turned on is be considered a positive current inject, then turning on AL and BH would cause a corresponding negative current inject into phase leg B 116 and passing through leg A 114. The voltage of the silent terminal C 118 is similarly measured and compiled as follows in Equations (4) to (6)

$$V_{BA} = R_{BA} i_{BA} + L_{BA} \frac{d i_{BA}}{dt} \Rightarrow \quad (4)$$

$$i_{BA} = \frac{V_{BA}}{R_{BA}} \left(1 - e^{-\frac{R_{BA}}{L_{BA}} t}\right) \quad (5)$$

$$V_C = \quad (6)$$

$$V_{DF} + R_A i_{BA} + L_A \frac{d i_{BA}}{dt} = V_{DF} + V_{BA} \frac{R_A}{R_{BA}} + V_{BA} \left(\frac{L_A}{L_{BA}} - \frac{R_A}{L_{BA}}\right) e^{-\frac{R_{BA}}{L_{BA}} t}$$

Certain assumptions are then made in the solution of the above equations, such as assuming that the physical construct of the winding coils are equal, and thus having RAB=RBA, and that the voltage supplied to the phase legs are consistent and not degraded from the DC link 142, such that VAB=VBA=VDC. To simplify the analysis, we assume RA=RB=R and VDF=0, and the resultant positive and negative inject silent terminal voltages VC+ and VC− can be provided as:

$$V_C^+ = \frac{V_{in}}{2} + V_{in} \left(\frac{L_B}{L_{AB}} - \frac{1}{2}\right) e^{-\frac{2R}{L_{AB}} t} \quad (7)$$

$$V_C^- = \frac{V_{in}}{2} + V_{in} \left(\frac{L_A}{L_{BA}} - \frac{1}{2}\right) e^{-\frac{2R}{L_{BA}} t} \quad (8)$$

It can thus be seen from Equations (7) and (8) that positive and negative inject silent terminal voltages VC+ and V−C− relate closely to the inductance LA 122 of phase leg A, and the inductance LB 124 of phase leg B. LA 122 and LB 124 are the representative total inductance in each phase leg and as mentioned above, the coil inductance is affected not only by the position of the permanent magnet with respect to the stator coils, but also the introduction of electrical voltage/current into the coils, which induce a magnetic field that further acts on the inductance of the coils.

As such, by determining the silent terminal voltages when electrically stimulating the two of the three phase legs, the position of the stator can be estimated or determined. According to the present embodiment a method of identifying the rotor position includes measuring the silent third phase of the 3-phase windings while providing a voltage injection into two of the three phase legs according to the six possible combinations of switching arrangements provided by the switches of the switching circuit 140. The switching combinations allow the determinations to be classified under six segments, wherein the switching combinations provide resultant current-induced magnetic field variations which identify that the rotor is in one of six segments of the rotor. Essentially the stator is divided up into six segmented phases of 60° for ease of identification. These six segments are provided by the following switching combinations or configurations—AHBL, ALBH, BHCL, BLCH, CHAL, CLAH.

Figure 4A:
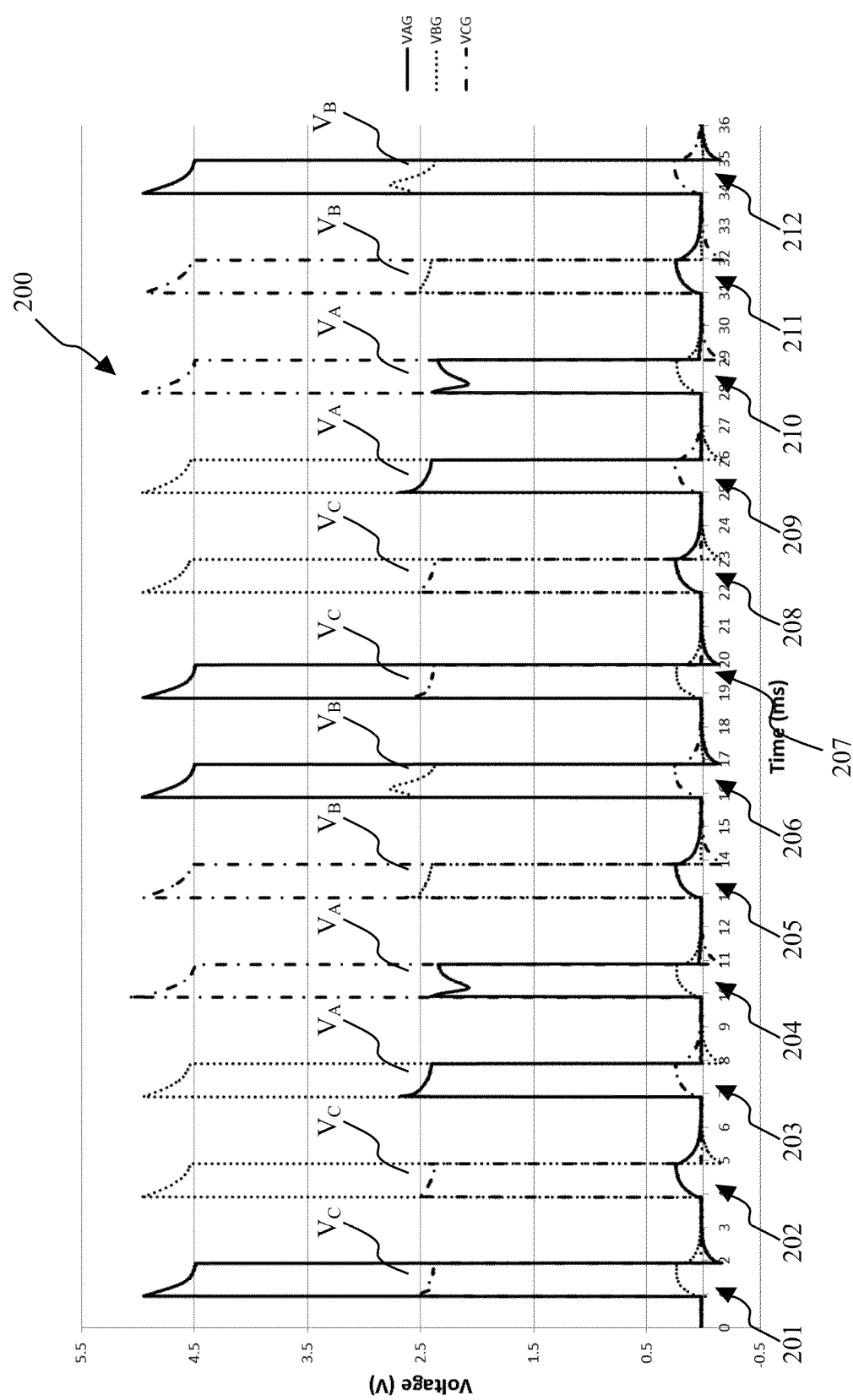
FIG. 4A shows resultant terminal voltage measurements in response to six segmented switching combinations according to an embodiment.

FIG. 4A shows resultant terminal voltage measurements in response to the six segmented switching combinations. Chart 200 plots the silent terminal measurements according to the plurality of segmented switching combinations. In chart 200 according to the present embodiment, the motor 100 is electrically stimulated according to two iterations of the six segmented switching combinations, and the twelve voltage measurements reflect the process. In other embodiments, only six measurements according to the six switching combinations may be taken for a quick determination, or other multiples of experimentation may be carried out for more certainty of the results and the resultant rotor position determination.

In chart 200, voltage measurements are taken for each of the phase legs 114, 116, and 118 during each switching combination voltage injection. The different phase leg voltage readings are then superimposed to form chart 200 to highlight the electrical performance of the stator circuit through voltage measurements in the phase legs, as according to the various switching combinations.

The various switching combinations provide the following measurement readings: switching combination AHBL produces resultant measurement readings 201 and 207, switching combination ALBH produces resultant measurement readings 202 and 208, switching combination BHCL produces resultant measurement readings 203 and 209, switching combination BLCH produces resultant measurement readings 204 and 210, switching combination CHAL produces resultant measurement readings 205 and 211, and switching combination CLAH produces resultant measurement readings 206 and 212.

Figure 4B:
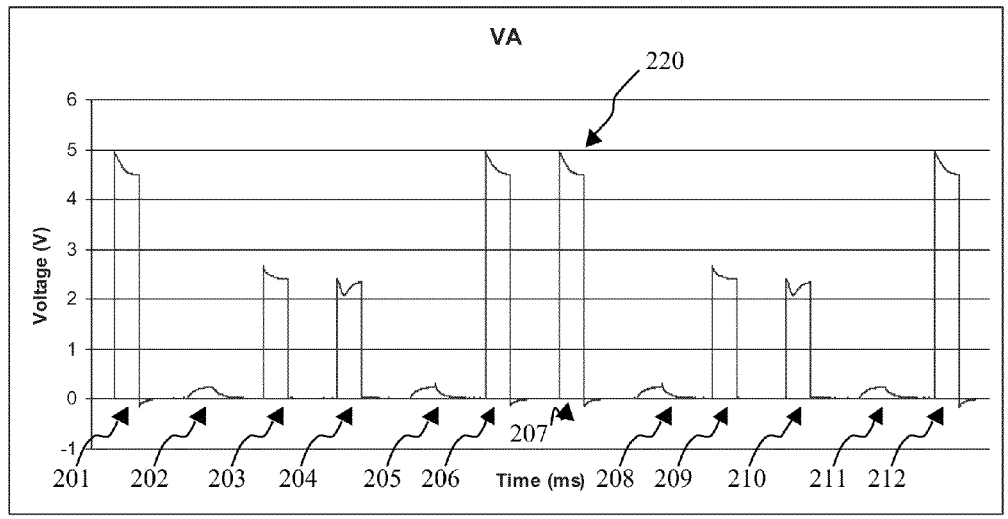
FIGS. 4B-4D show corresponding resultant terminal voltage measurements for phase leg A, phase leg B, and phase leg C respectively, in response to the six segmented switching combinations.
Figure 4C:
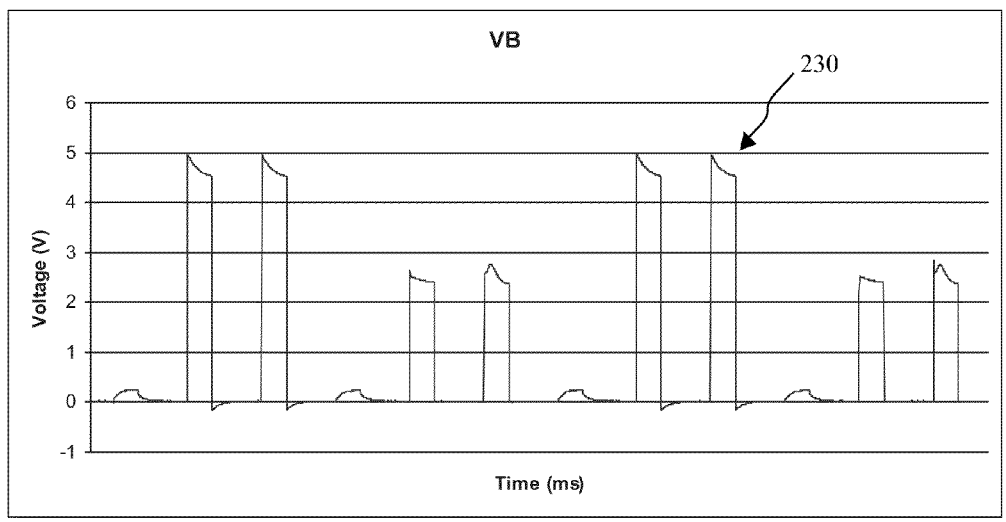
Figure 4D:
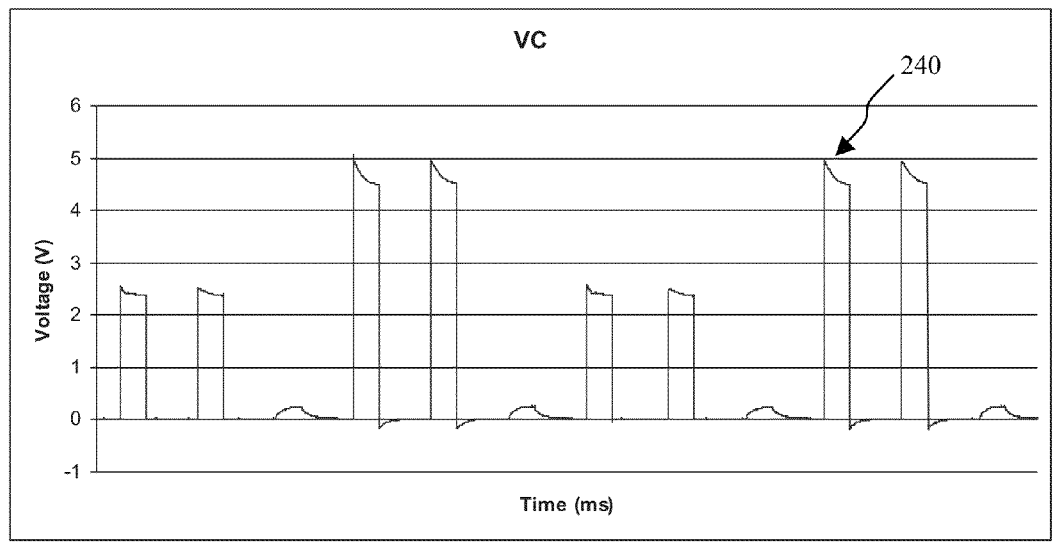

FIGS. 4B-4D shows corresponding resultant terminal voltage measurements for phase leg A, phase leg B, and phase leg C, in response to the six segmented switching combinations. In FIG. 4B, voltage measurement VA 220 is charted as according to the voltage injects from the various switching combinations. Similarly, in FIG. 4C, voltage measurement VB 230 is charted as according to the voltage injects from the various switching combinations. In FIG. 4D, voltage measurement VC 240 is charted as according to the voltage injects from the various switching combinations.

In FIG. 4B, voltage measurement VA 220 shows the voltage along phase leg A 114 when voltage is passed through the stator 110 coil windings according to the various switching combinations carried out by the switching circuit 140. During measurement reading 201 resulting from switching combination AHBL, it is noted that phase leg A 114 is coupled through switch AH to the positive rail of DC link 142 and provided with a voltage input VDC and phase leg B 116 is coupled through switch BL to the negative rail of DC link 142. This is reflected as a marked increase in the voltage measurement VA at 201, to about 2V before the circuit inductance parasitically pulls down the terminal voltage during the time the switches AH and BL are open, i.e. for about 1 ms.

In measurement reading 202 resulting from switching combination ALBH, phase leg A 114 is coupled through electrical switch AL to the negative rail of DC link 142, while phase leg B 116 is coupled through electrical switch BH to the positive rail of DC link 142. Voltage VDC is passed through the coil windings 124, which causes a small corresponding voltage rise, which is limited by the inductance in phase legs A 114 and B 116 during the opening of the switches ALBH. It is noted that the buildup in voltage in the coil windings is quickly dissipated when the switches, and thus the connection to the voltage source, are closed.

In measurement reading 203 resulting from switching combination BHCL, phase leg B 116 is coupled through electrical switch BH to the positive rail of DC link 142, while phase leg C 118 is coupled through electrical switch CL to the negative rail of DC link 142. In this case, phase leg A 114 is considered the silent terminal, and a measurement of the silent terminal voltage is captured. As determined in Equations (7) and (8), the voltage VA along the silent terminal leg is a function of the inductances, both physical, from the coil windings, and magnetically induced, from the voltage/current injection, in phase legs B 116 and C 118. Also, as from the above equations, the voltage VA at 203 would be somewhere in the order of Vin/2≈2.5V.

The measured reading of VA as a silent terminal reading thus directs the system into a determination of an initial position of the rotor 112. The obtained voltage measurement VA is further provided to the terminal voltage digital acquisition module 152, which converts the analog output of the voltage into tangible voltage sample readings, with respect to time and number of predetermined operating samples of the DAQ. Attention is paid to the measurement readings when phase leg A 114 is considered the silent terminal, i.e. at 204 and 204 (and 209 and 210), and according to the present embodiment, a relevant filter is provided in the DAQ 152 during digital sampling to only focus on the silent terminal measurement results.

Similar observations may also be made for the remainder of the measurements resultant from the various switching combinations, and as well as the corresponding voltage measurements in phase legs B and C in FIGS. 4C and 4D respectively.

Returning back to FIG. 4A, as mentioned, chart 200 is formed by superimposing the voltage measurements VA 220, VB 230, and VC 240. Attention is paid to the central (≈2.5V) readings of the silent terminal voltage measurements across the phase legs as according to the injections made by the six segmented switching combinations 201-212. It may be noted that there are variations in the silent terminal voltage measurements, which reflect the effect caused by the stationary rotor 112 with respect to the coil windings and additionally the voltage injection. According to the present disclosure, the differences in the silent terminal measurements are sufficient to identify, or estimate, a rotor position of the motor, and to control the motor therefrom.

In the embodiment, the DAQ module 152 digitally samples the three phase leg measurements and obtains silent terminal voltage measurements sorted according to the respective segmented switching combination of the switching circuit. The silent terminal voltage measurements are then compared with a baseline chart, shown in Table 1, to determine an estimated rotor position of the motor. In referring to a "baseline", it is stated that the present disclosure seeks to experimentally determine and provide a point of reference for which measurements made in seeking to establish a rotor position according to an embodiment may be compared with to obtain a corresponding result.

TABLE 1

Comparison table for rotor position determination

| | | Estimated Rotor Position Phase Segment |
|---|---|---|
| $V_A (BHCL)_{min}$ | $V_C (AHBL)_{min}$ | 0°-60° |
| $V_A (BLCH)_{max}$ | $V_B (CHAL)_{max}$ | 60°-120° |
| $V_B (CHAL)_{min}$ | $V_C (ALBH)_{min}$ | 120°-180° |
| $V_A (BHCL)_{max}$ | $V_C (ALBH)_{max}$ | 180°-240° |
| $V_A (BHCL)_{min}$ | $V_B (CLAH)_{min}$ | 240°-300° |
| $V_B (CLAH)_{max}$ | $V_C (AHBL)_{max}$ | 300°-360° |

Prior to carrying out a determination comparison, the initial position detection module 150 receives the digitally sampled measurement data of the silent terminal measurements from the terminal voltage DAQ module 152. The initial position detection module 150 further carries out a sorting function on the obtained measurement data, to identify a maximum and a minimum value of the silent terminal voltage measurement of each phase leg, with respect to the switching combination. (this statement has no direct link with the algorithm) The maximum and minimum values are stored according to the respective switching combination, such that six sets of maximum and minimum values of silent terminal voltage measurements are obtained. Further, where there are multiple runs of voltage injects according to the various switching combinations, an averaging may be carried out to provide more certain results for comparison.

After the maximum and minimum values are obtained, the initial position detection module 150 further carries out a sort, by value, through the six sets of maximum and minimum values. The sort results in an ordered set of maximum values from the highest maximum silent terminal voltage to the lowest maximum silent terminal voltage. An ordered set of minimum values from the lowest minimum silent terminal voltage to the highest minimum silent terminal voltage is also obtained.

An extraction is thereafter carried out by the initial position detection module 150, to obtain the two highest maximum silent terminal voltage values, and the two lowest minimum silent terminal voltage values, each value identified with a corresponding switching combination. Providing two highest or lowest values for comparison allows for more certainty in the comparison process, as compared with simply just referencing the highest value, which may require further algorithmic analysis prior to being able to determine the rotor position phase segment.

A comparison is then carried out between the determined two highest maximum silent terminal voltage values and the two lowest minimum silent terminal voltage values with references of Table 1. A comparison of the value pairs would lead to a corresponding determination of the phase segment of the position of the rotor. For example, if the two highest maximum values as extracted relate to VA when the switches BHCL are active and VC when the switches ALBH are active, matching this pair to the table provided would lead to a determination that the rotor is in the 180°-240° phase segment, particularly, that the permanent magnet 120 on the rotor 112 is aligned somewhere within the 180°-240° phase segment.

Prior to discussion the operation of the motor 100 with the determination of the rotor position, the propagation of the baseline comparison chart as provided in Table 1, according to an embodiment, for use in the determination of rotor position by the initial position detection module 150 will be described with the following.

Figure 5:
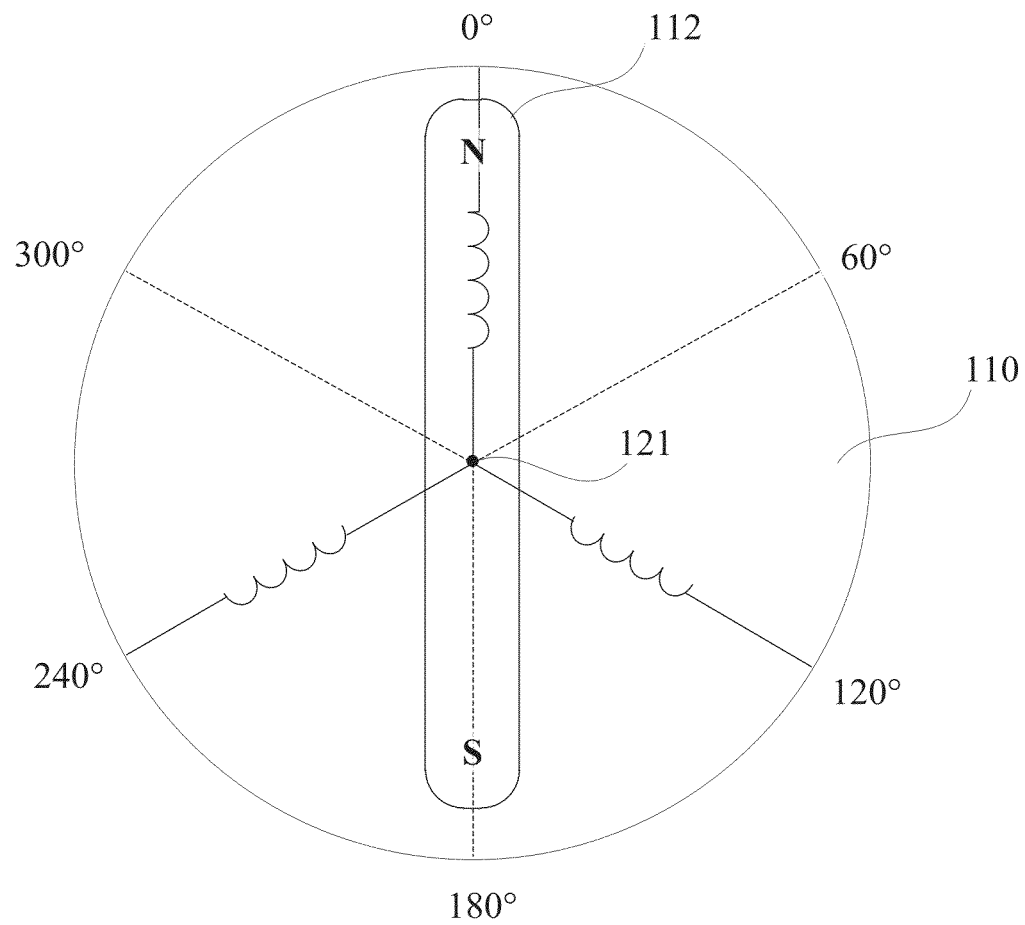
FIG. 5 illustrates a rotor being aligned with a stator and determined phase segments therefrom.

In the determination of a baseline comparison, the rotor 112 of the motor 100 is set into pre-arranged positions to obtain experimental readings to propagate the comparison chart. FIG. 5 illustrates a rotor being aligned with a stator and determined phase segments therefrom, according to the embodiment. In FIG. 5 rotor 112, in particular permanent magnet 120 mounted on the rotor 112, is illustrated as being aligned with the phase leg A 114 of stator 110, which is thereafter determined as the geometrical origin 0° for rotor position referencing. Accordingly, rotational translation of the rotor 112 about the central rotational axis 121 would bring the rotor 112 about the geometrical reference demarcated in 60° phases.

When the rotor 112 is provided at 0°, the initial position detection module 150 carries out an activation of the six varying switching combinations, and the measurement results of the silent phase voltages are received and charted by the terminal voltage DAQ module 152. It will be noted that as voltage injects with respect to different switching combinations produce a motor current through different phase legs of the stator that induces magnetic fields with differing directions, thus leading to phase leg inductances being affected in differing ways, the resultant silent terminal voltage measurement will also vary differently with respect to the plurality of switching combinations.

Figure 6A:
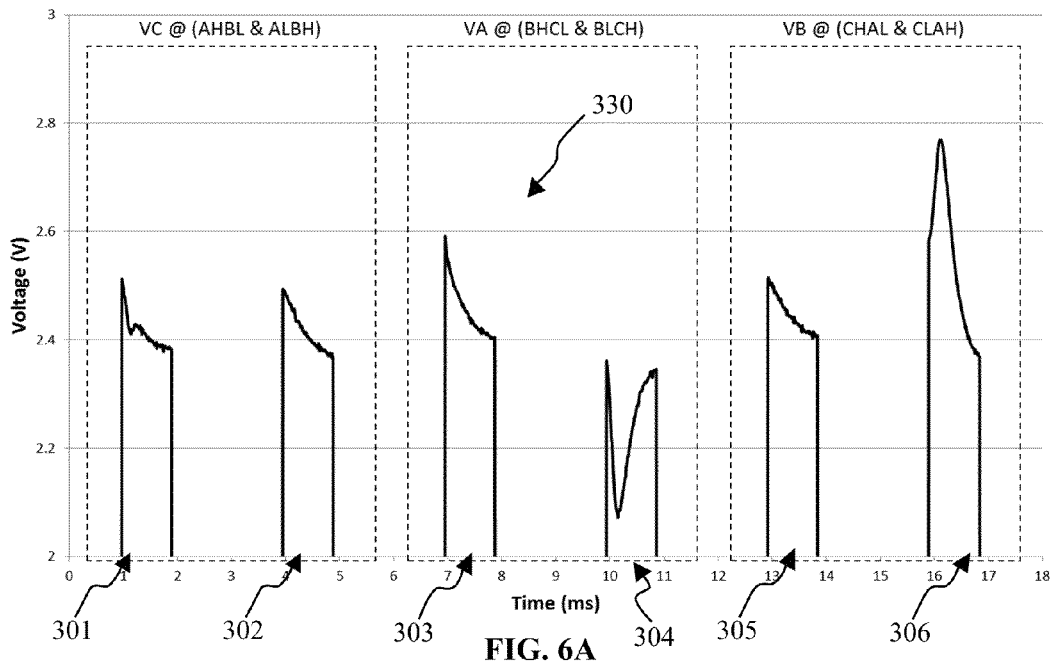
FIGS. 6A-6F are plots of silent terminal voltage measurements for varying switching combinations when the rotor is set to 0°, 60°, 120°, 180°, 240°, and 300° respectively.
Figure 6B:
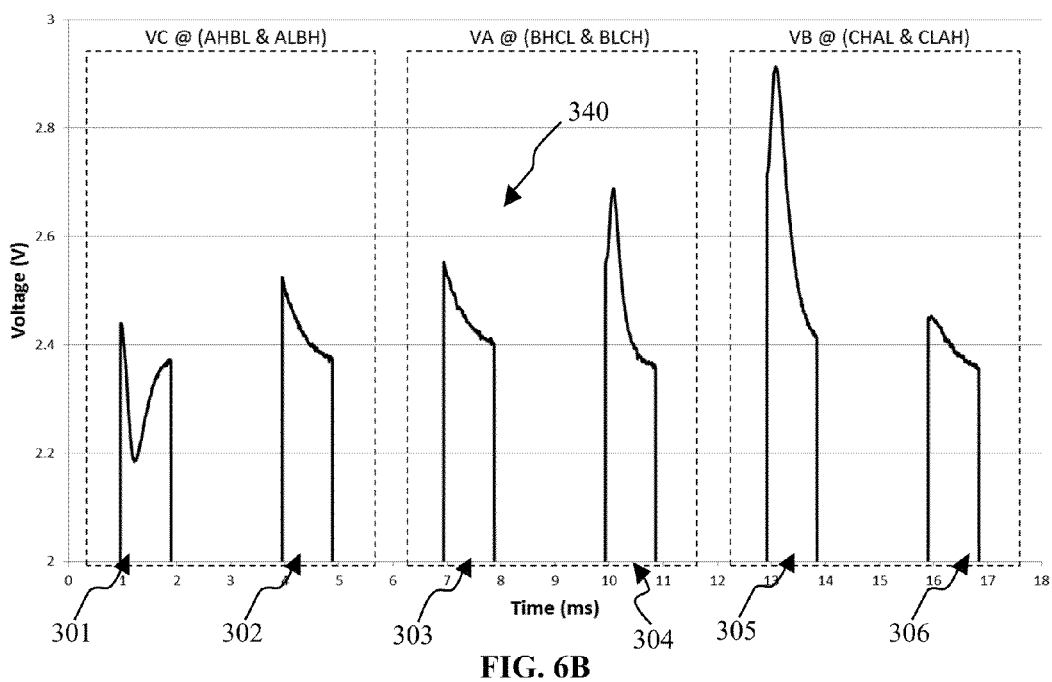
Figure 6C:
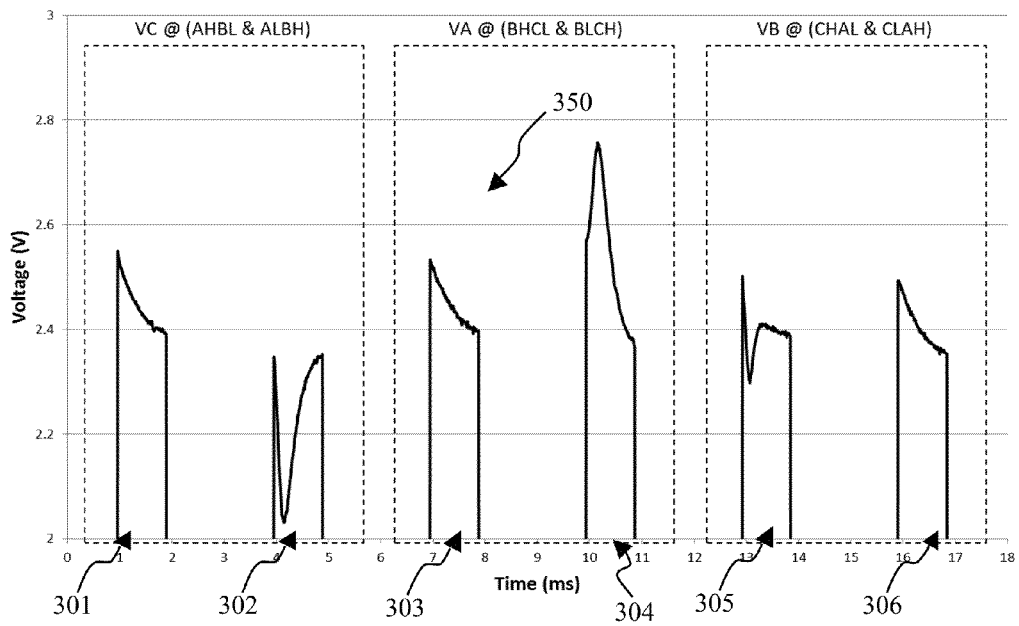
Figure 6D:
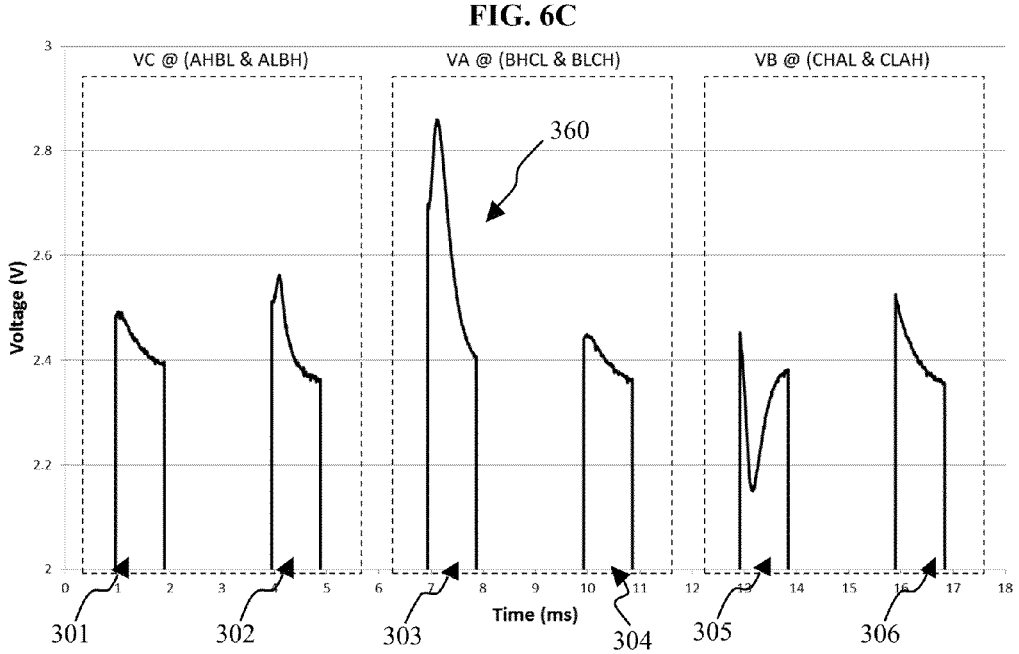
Figure 6E:
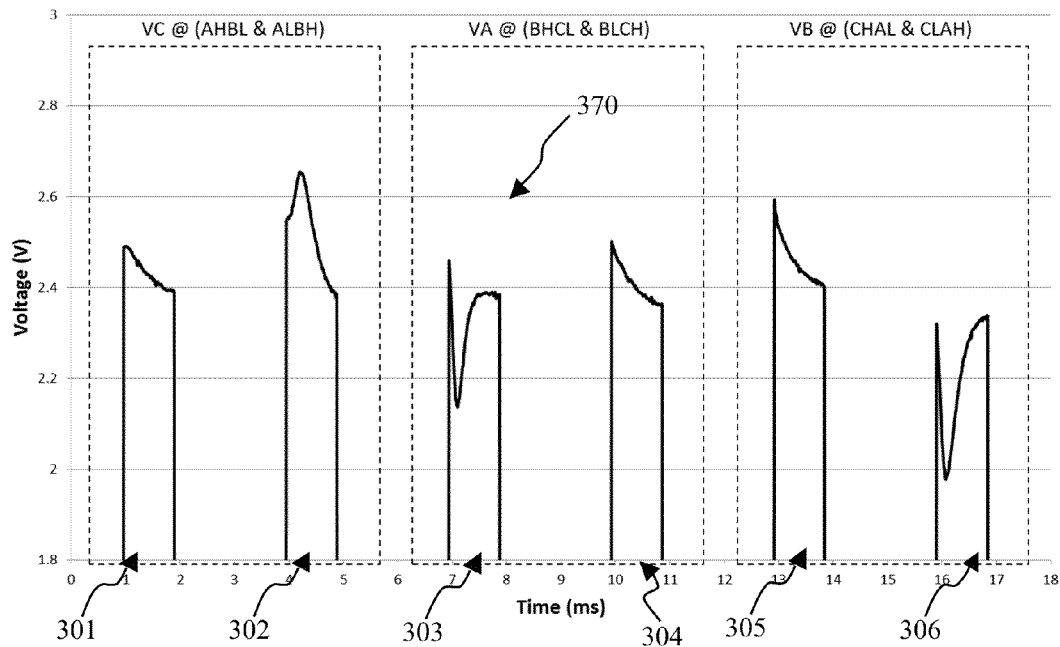
Figure 6F:
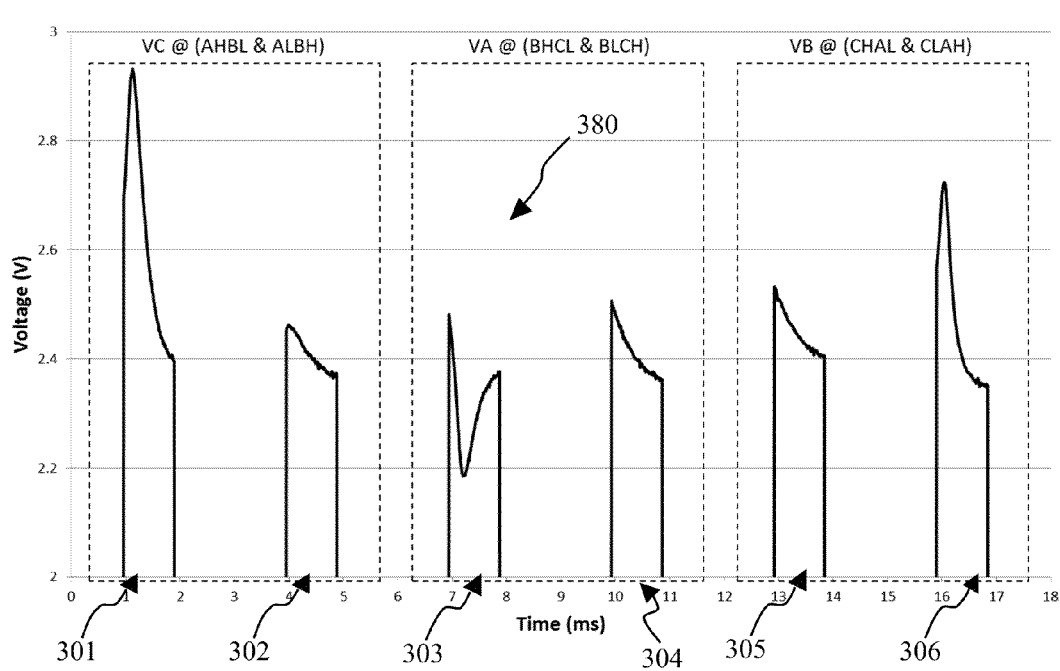

FIG. 6A is a plot of silent terminal voltage measurements for varying switching combinations when the rotor is set to 0°. Plot 330 depicts silent terminal voltage measurements taken and illustrates voltage responses with respect to the various switching combinations: switching combination AHBL produces resultant measurement reading 301, switching combination ALBH produces resultant measurement reading 302, switching combination BHCL produces resultant measurement reading 303, switching combination BLCH produces resultant measurement reading 304, switching combination CHAL produces resultant measurement reading 305, and switching combination CLAH produces resultant measurement reading 306.

It can be observed from FIG. 6A that when the rotor 112 is at the 0° position, when the controller 102 cycles through the various switching combinations for the switching circuit, a responsive trough occurs at switching combination BLCH 304, and a peak occurs at where switching combination CHAL 306 is active.

Similar observations may also be made for the remainder of the silent terminal voltage measurements resultant from the various switching combinations, and according to the remaining predetermined rotor positions 60°, 120°, 180°, 240°, 300° as shown in corresponding plots 340, 350, 360, 370 and 380 in FIGS. 6B, 6C, 6D, 6E, and 6F respectively.

Figure 7A:
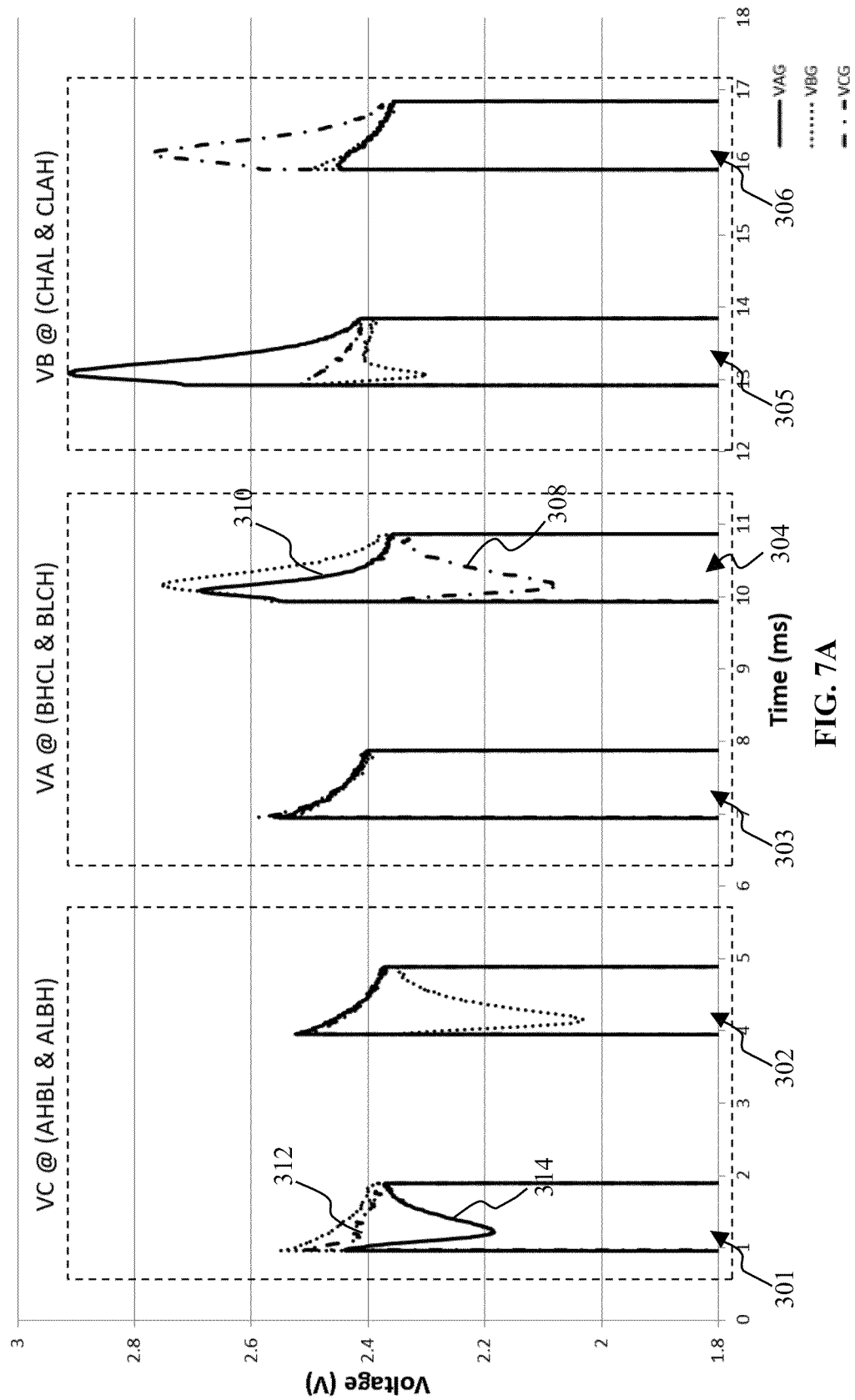
FIG. 7A illustrates silent terminal voltage measurements when the rotor is at phase positions 0°, 60°, and 120°.
Figure 7B:
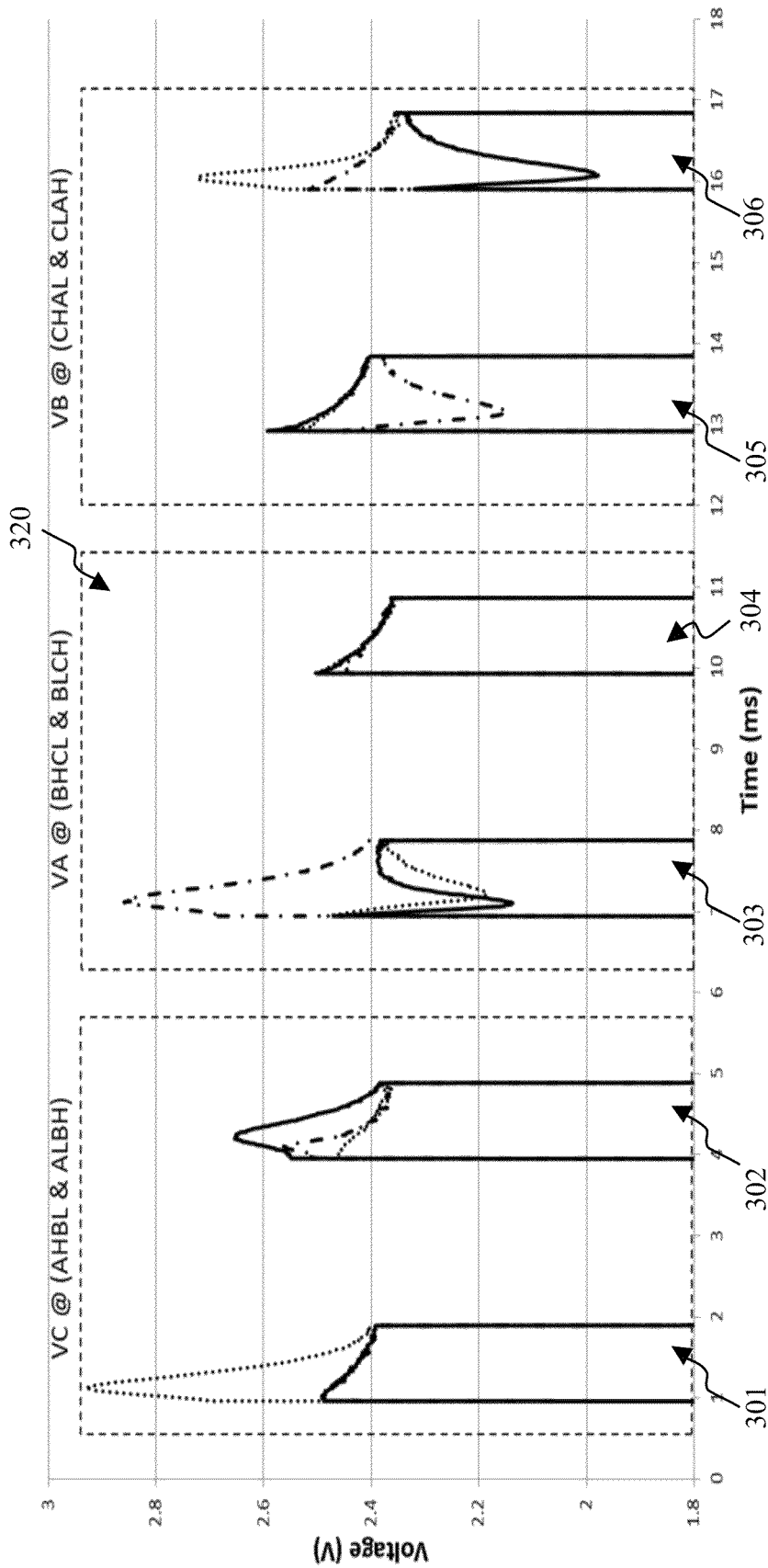
FIG. 7B illustrates silent terminal voltage measurements when the rotor is at phase positions 180°, 240°, and 300°.

In order to provide a thorough overview of the measurement results between the different rotor phase positions, FIGS. 7A and 7B are provided, wherein the silent terminal voltage measurement results with respect to the different rotor phase positions are superimposed over each other.

FIG. 7A illustrates silent terminal voltage measurements when the rotor is at phase positions 0°, 60°, and 120°. FIG. 7B illustrates silent terminal voltage measurements when the rotor is at phase positions 180°, 240°, and 300°. In intending to obtain charted baselines of the measurement characteristics such that a rotor position estimate may be determined, according to the present embodiment, the method provides for a projection of the rotor position by utilizing silent terminal voltage measurements based on switching combination voltage injections.

According to various embodiments, a comparison is made in each phase segment to determine the most dominant pattern, either with maximum or minimum voltage values, within each phase segment. In each phase segment, silent terminal voltage measurements are obtained for all six switching combination voltage injections.

According to various embodiments, a comparison is made in between the voltage measurements at 0° and 60° to determine such a dominant pattern, and in so doing correlates such a dominant pattern to a projection where the rotor (directionally) is within the 0°-60° phase segment. In this case, in seeking a dominant pattern in the phase segment, it can be observed that in combined plot 300 in FIG. 7A, silent terminal voltage measurement VA, at switching combination BLCH 304, dips during switching activation at 0° as measured at 308, and measures at 310 at 60°. This indicates that the silent terminal voltage would be somewhere in between 308 and 310 when the rotor is within the 0°-60° phase segment, perhaps at about 2.35V By inspection, a similar assumption can be made for silent terminal voltage measurement VC at switching combination AHBL 301, between 312 at 0° and 314 at 60°. The dominant pattern projection is thus made for the 0°-60° phase segment, such that if measured silent terminal voltages are minimal for VC at the AHBL switching combination and VA at the BLCH switching combination, an projection can be made that the initial rotor position is likely to be located within the 0°-60° phase segment. Similar observations can thereafter be made for subsequent phase segments and as charted as 300 and 320 in FIGS. 7A and 7B, such that the comparative values in Table 1 are propagated for a comparison to be carried out by the initial position detection module 150.

In the following, operational control of BLDC motor is discussed according to various embodiments. According to various embodiments, the correct switching status after the initial position is identified can be determined such that the correct spinning direction can be achieved without any inverse movement of the rotor 112. Once the rotor 112 is identified to be in the 60° position phase segment by the initial position detection module 150, the controller 102 proceeds with starting the motor 100 in order to commence operation. In order to do so, correct phases have to be energized so that the motor 100 can spin in the correct direction, and generate sufficiently high electromagnetic torque.

According to various embodiments, the controller 102 energizes the respective phases in accordance to the initial position phase segment of the rotor. In particular, startup module 154 receives a determined initial position of the rotor from the initial position detection module 150, and provides PWM-based signals for energizing a particular arrangement of coils in the stator 110 for starting up the motor 110. Table 2 provides the switching combination for energizing, further based on the direction of rotation, according to an embodiment. It is noted that the table shows the sequence of forward (FW) and reverse (REV) switching sequences for a BLDC motor according to the present embodiment. As mentioned, the method and system for controlling a motor according to the present disclosure is not limited to a BLDC motor as presently described, and further tables with corresponding propagated data may be provided for various other motors

TABLE 2

| Switching combination for energizing phase windings | | | | | | |
|---|---|---|---|---|---|---|
| Direction | 0°-60° | 60°-120° | 120°-180° | 180°-240° | 240°-300° | 300°-360° |
| FW | AH CL | AH BL | CH BL | CH AL | BH AL | BH CL |
| REV | CH AL | BH AL | BH CL | AH CL | AH BL | CH BL |

Figure 8:
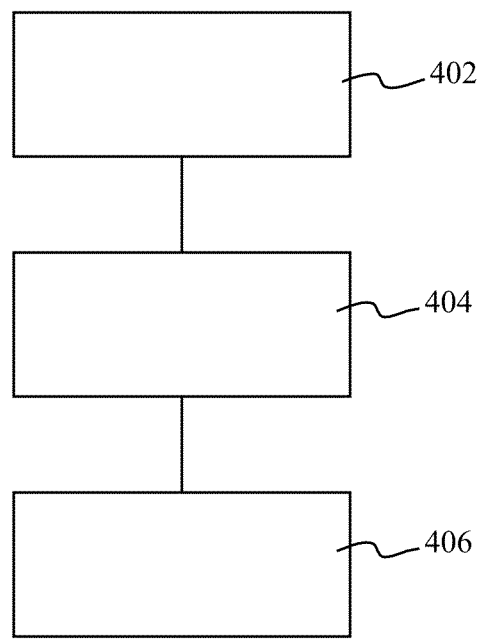
FIG. 8 illustrates a block diagram of a method for controlling a motor according to an embodiment.

According to another aspect of the present disclosure, there is provided a method or process of controlling a motor, more particularly for determining an initial rotor position in controlling a motor. FIG. 8 illustrates a block diagram 400 of a method for controlling a motor according to an aspect of the present disclosure.

In 402, the method may include providing an input voltage between two of the three terminals of the electromagnetic winding configuration. In 404, the method may include measuring a resultant silent terminal voltage at the third terminal of the electromagnetic winding configuration. In 406, the method may include determining a rotor position based on the measured silent terminal voltage.

According to an embodiment, the method further includes obtaining a plurality of silent terminal voltage measurements, which include manipulating a switching circuit coupled to the three terminals of the electromagnetic winding configuration to close an electrical circuit and to provide an input voltage between two of the three terminals of the electromagnetic winding configuration according to a plurality of switching combinations. The method further includes measuring a corresponding plurality of silent terminal voltages.

According to an embodiment, the method includes determining a rotor position based on the plurality of silent terminal voltages.

According to an embodiment, the method further includes determining a maximum and a minimum value of each of the plurality of silent terminal voltage measurements.

According to an embodiment, the method further includes sorting by value the maximum and minimum values of the plurality of silent terminal voltages measurements.

According to an embodiment, the method further includes comparing with a comparison table the sorted maximum and minimum values of the plurality of silent terminal voltages measurements; and determining a rotor position of the motor based on the comparison.

According to an embodiment, the method further includes determining the comparison table, including: holding the rotor at a range of fixed positions and obtaining a plurality of baseline silent terminal voltage measurements according to the plurality of switching combinations; and determining a switching configuration corresponding to a rotor position based on the plurality of baseline silent terminal voltage measurements.

According to an embodiment, the range of fixed positions includes aligning any one of the North and South poles of a permanent magnet on the rotor with a winding alignment of the stator.

According to an embodiment, the method further includes starting the motor based on the determined rotor position, wherein the determined rotor position is an initial rotor position of the motor.

According to an embodiment, starting the motor includes energizing two terminals of the electromagnetic winding configuration based on the initial rotor position of the motor.

Figure 9:
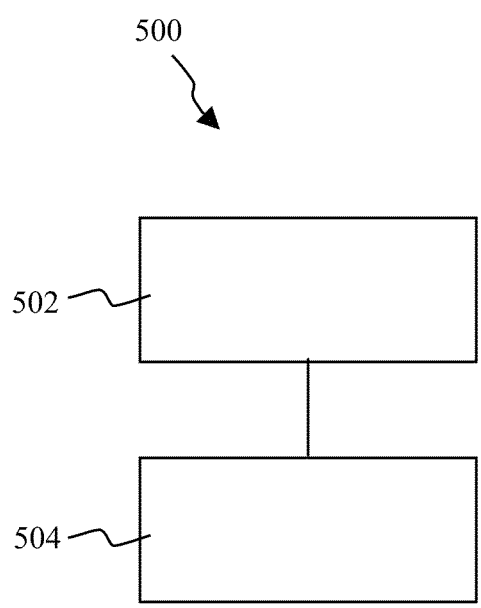
FIG. 9 illustrates a block diagram of a system for controlling a motor according to an embodiment.

According to another aspect of the present disclosure, there is provided a system for controlling a motor, more particularly for determining an initial rotor position in controlling a motor. FIG. 9 illustrates a block diagram 500 of a system for controlling a motor according to an aspect of the present disclosure.

In block diagram 500, the system may include a voltage source 502 configured to provide an input voltage between two of the three terminals of the electromagnetic winding configuration as provided in a 3-phase synchronous motor. Further, the system may include a rotor position detection module 504 configured to measure a resultant silent terminal voltage at the third terminal of the electromagnetic winding configuration and to determine a rotor position based on the measured silent terminal voltage.

According to an embodiment, the rotor position detection module is configured to manipulate a switching circuit coupled to the three terminals of the electromagnetic winding configuration to close an electrical circuit and provide an input voltage between two of the three terminals of the electromagnetic winding configuration according to a plurality of switching combinations, and to measure a corresponding plurality of silent terminal voltages, in obtaining a plurality of silent terminal voltage measurements.

According to an embodiment, the rotor position detection module is configured to determine a maximum and minimum value of each of the plurality of silent terminal voltage measurements.

According to an embodiment, the rotor position detection module is configured to sort by value the maximum and minimum values of the plurality of silent terminal voltages measurements.

According to an embodiment, the rotor position detection module is configured to compare with a comparison table the sorted maximum and minimum values of the plurality of silent terminal voltages measurements, to determine a rotor position of the motor.

According to an embodiment, the rotor position detection module is configured to hold the rotor at a range of fixed positions and obtain a plurality of baseline silent terminal voltage measurements according to the plurality of switching combinations; and determine a switching configuration corresponding to a rotor position based on the plurality of baseline silent terminal voltage measurement.

According to an embodiment, the range of fixed positions includes aligning any one of the North and South poles of a permanent magnet on the rotor with a winding alignment of the stator.

According to an embodiment, the system further includes a motor control module coupled to receive a rotor position from the rotor position detection module, wherein the motor control module is configured to start the motor based on the received rotor position.

According to an embodiment, the motor control module is configured to start the motor by energizing two terminals of the electromagnetic winding configuration based on the received rotor position of the motor.

According to an embodiment, the system further includes three voltage sensors each coupled to a leg of the electromagnetic winding configuration.

According to an embodiment, the electromagnetic winding configuration is a wye winding configuration, and the three voltage sensors are coupled at the wye winding intersection.

The above method and system as described and illustrated in the corresponding figure, is not intended to limit a or any method or system as according to an embodiment, and the scope of the present disclosure. The description further includes, either explicitly or implicitly, various features and advantages of the method or system according to the present disclosure, which can be encompassed within a method or system according to the disclosure.

While embodiments of the disclosure have been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A method of controlling a 3-phase synchronous motor, wherein the 3-phase synchronous motor comprises a stator, wherein the stator has an electromagnetic winding configuration with three terminals, and wherein the three terminals are connected to a switching circuit, the method comprising:
   for each of a plurality of iterations and a corresponding one of a plurality of switching combinations of the switching circuit, providing an input voltage across two of the three terminals of the electromagnetic winding configuration, wherein the switching circuit comprises a plurality of switches, wherein the plurality of switches have a respective set of states for each of the plurality of iterations such that the switching circuit is in a different configuration for each of the plurality of iterations;
   for each of the plurality of iterations, measuring a resultant silent terminal voltage at the third terminal of the electromagnetic winding configuration for which an input voltage was not applied; and
   subsequent to the plurality of iterations, determining a rotor position of the 3-phase synchronous motor based on the resultant silent terminal voltages of the plurality of iterations.

2. The method according to claim 1, further comprising starting the 3-phase synchronous motor based on the rotor position, wherein the rotor position is an initial rotor position of the 3-phase synchronous motor.

3. The method according to claim 2, wherein starting the 3-phase synchronous motor comprises energizing two terminals of the electromagnetic winding configuration based on the initial rotor position of the 3-phase synchronous motor.

4. The method according to claim 1, further comprising:
   for each of the iterations and for the third terminal, determining a maximum silent terminal voltage and a minimum silent terminal voltage;
   sorting by the maximum silent terminal voltages;
   sorting the minimum silent terminal voltages;
   comparing entries of a comparison table with the sorted maximum silent terminal voltages and the sorted minimum silent terminal voltages; and
   determining the rotor position of the 3-phase synchronous motor based on the comparisons.

5. The method according to claim 1, further comprising:
   for each of the iterations and for the third terminal, determining a maximum silent terminal voltage and a minimum silent terminal voltage;
   sorting by the maximum silent terminal voltages;
   sorting the minimum silent terminal voltages;
   determining the highest two of the sorted maximum silent terminal voltages;
   determining the lowest two of the sorted minimum silent terminal voltages;
   comparing entries of a comparison table with the highest two of the sorted maximum silent terminal voltages and the lowest two of the sorted minimum silent terminal voltages; and
   determining the rotor position of the 3-phase synchronous motor based on the comparisons.

6. A method of controlling a 3-phase synchronous motor with three terminals of an electromagnetic winding configuration, the method comprising:
   providing an input voltage between two of the three terminals of the electromagnetic winding configuration;
   measuring a resultant silent terminal voltage at the third terminal of the electromagnetic winding configuration;
   determining a rotor position of the 3-phase synchronous motor based on the resultant silent terminal voltage;
   manipulating a switching circuit coupled to the three terminals of the electromagnetic winding configuration to close an electrical circuit and provide an input voltage between two of the three terminals of the electromagnetic winding configuration according to a plurality of switching combinations; and
   measuring a corresponding plurality of silent terminal voltages for the plurality of switching combinations.

7. The method according to claim 6, further comprising, for each of the switching combinations, determining a maximum silent terminal voltage and a minimum silent terminal voltage.

8. The method according to claim 7, further comprising sorting by value the maximum silent terminal voltages and the minimum silent terminal voltages.

9. The method according to claim 8, further comprising:
   comparing entries of a comparison table with the sorted maximum silent terminal voltages and the sorted minimum silent terminal voltages; and
   determining the rotor position of the 3-phase synchronous motor based on the comparisons.

10. The method according to claim 9, further comprising determining the entries of the comparison table comprising:
   holding a rotor of the 3-phase synchronous motor at a range of fixed positions and obtaining a plurality of baseline silent terminal voltages according to the plurality of switching combinations, wherein the baseline silent terminal voltages provide points of reference for comparison with some of the maximum silent terminal voltages and the minimum silent terminal voltages; and
   determining a switching configuration corresponding to the rotor position based on the plurality of baseline silent terminal voltages.

11. The method according to claim 10, wherein the range of fixed positions comprises aligning any one of north poles and south poles of a permanent magnet on the rotor with a winding alignment of a stator of the 3-phase synchronous motor.

12. The method according to claim 6, wherein:
   the plurality of silent terminal voltages include the silent terminal voltage at the third terminal; and
   the rotor position of the 3-phase synchronous motor is determined based on the plurality of silent terminal voltages.

13. A system for controlling a 3-phase synchronous motor, wherein the 3-phase synchronous motor comprises a stator, wherein the stator has an electromagnetic winding configuration with three terminals, the system comprising:
   a switching circuit comprising a plurality of switches, wherein the plurality of switches are connected to the three terminals;
   a voltage source configured to, for each of a plurality of iterations and a corresponding one of a plurality of switching combinations of the switching circuit, provide an input voltage across two of the three terminals of the electromagnetic winding configuration, wherein the plurality of switches have a respective set of states for each of the plurality of iterations such that the switching circuit is in a different configuration for each of the plurality of iterations; and
   a rotor position detection module configured to measure a resultant silent terminal voltage at the third terminal of the electromagnetic winding configuration for which an input voltage was not applied,
   wherein the rotor position detection module is configured to, subsequent to the plurality of iterations, determine a rotor position based on the resultant silent terminal voltages of the plurality of iterations.

14. The system according to claim 13, further comprising a motor control module coupled to receive the rotor position from the rotor position detection module, wherein the motor control module is configured to start the 3-phase synchronous motor based on the rotor position.

15. The system according to claim 14, wherein the motor control module is configured to start the 3-phase synchronous motor by energizing two terminals of the electromagnetic winding configuration based on the rotor position of the 3-phase synchronous motor.

16. A system for controlling a 3-phase synchronous motor with three terminals of an electromagnetic winding configuration, the system comprising:
   a voltage source configured to provide an input voltage between two of the three terminals of the electromagnetic winding configuration; and
   a rotor position detection module configured to measure a resultant silent terminal voltage at the third terminal of the electromagnetic winding configuration,
   wherein
      the rotor position detection module determines a rotor position based on the resultant silent terminal voltage, and
      the rotor position detection module is configured to
         manipulate a switching circuit coupled to the three terminals of the electromagnetic winding configuration to close an electrical circuit and provide an input voltage between two of the three terminals of the electromagnetic winding configuration according to a plurality of switching combinations, and
         measure a corresponding plurality of silent terminal voltages for the plurality of switching combinations.

17. The system according to claim 16, wherein the rotor position detection module is configured to, for each of the switching combinations, determine a maximum silent terminal voltage and a minimum silent terminal voltage.

18. The system according to claim 17, wherein the rotor position detection module is configured to sort by value the maximum silent terminal voltages and the minimum silent terminal voltages.

19. The system according to claim 18, wherein the rotor position detection module is configured to compare entries of a comparison table with the sorted maximum silent terminal voltages and the minimum silent terminal voltages to determine the rotor position of the 3-phase synchronous motor.

20. The system according to claim 19, wherein the rotor position detection module is configured to:
   hold a rotor of the 3-phase synchronous motor at a range of fixed positions and obtain a plurality of baseline silent terminal voltages according to the plurality of switching combinations, wherein the baseline silent terminal voltages provide points of reference for comparison with some of the maximum silent terminal voltages and the minimum silent terminal voltages; and
   determine a switching configuration corresponding to the rotor position based on the plurality of baseline silent terminal voltages.

21. The system according to claim 20, wherein the range of fixed positions comprises aligning any one of north poles and south poles of a permanent magnet on the rotor with a winding alignment of a stator of the 3-phase synchronous motor.

22. The system according to claim 16, wherein:
   the plurality of silent terminal voltages include the silent terminal voltage at the third terminal; and
   the rotor position of the 3-phase synchronous motor is determined based on the plurality of silent terminal voltages.

* * * * *